April 27, 1943. W. B. NICHOLSON ET AL 2,317,936
APPARATUS FOR CUTTING OR FLAME-MACHINING METAL
Original Filed June 11, 1937 4 Sheets-Sheet 1
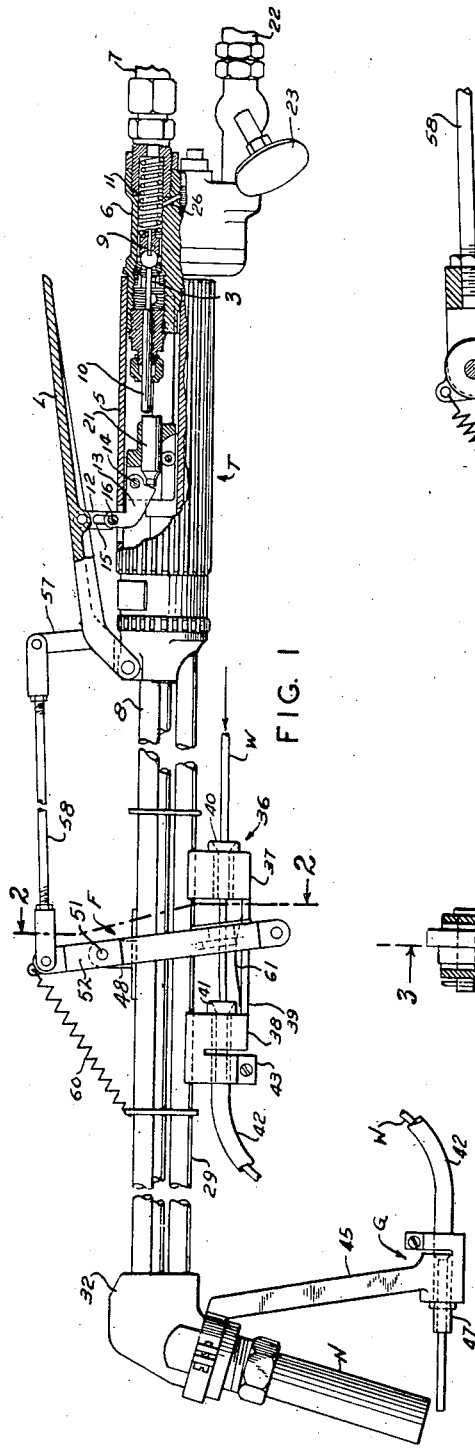
INVENTORS
WILLIAM BRYCE NICHOLSON
EVERETT P. JONES
BY *E L Greenewald*
ATTORNEY

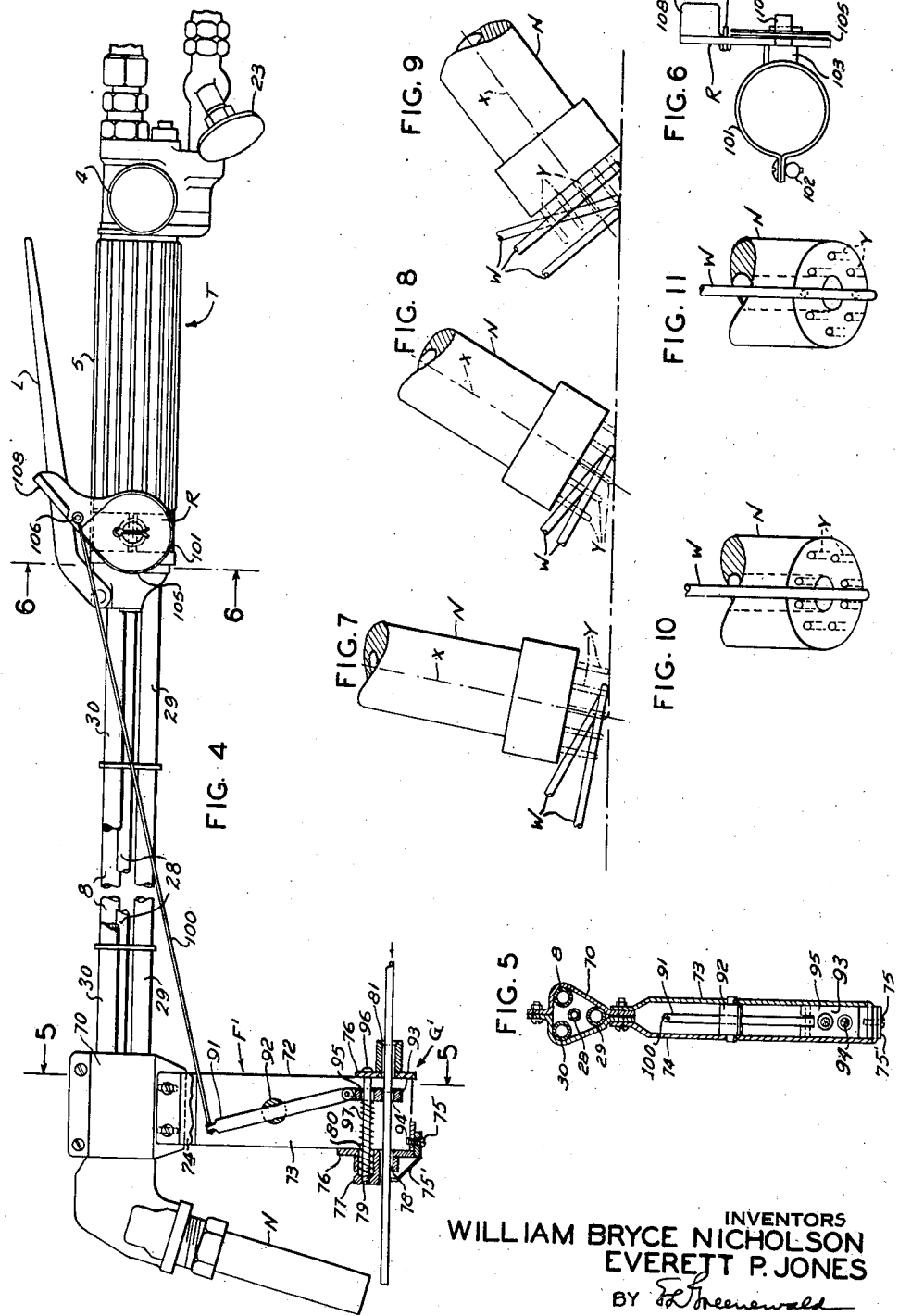

April 27, 1943.   W. B. NICHOLSON ET AL   2,317,936
APPARATUS FOR CUTTING OR FLAME-MACHINING METAL
Original Filed June 11, 1937   4 Sheets-Sheet 3
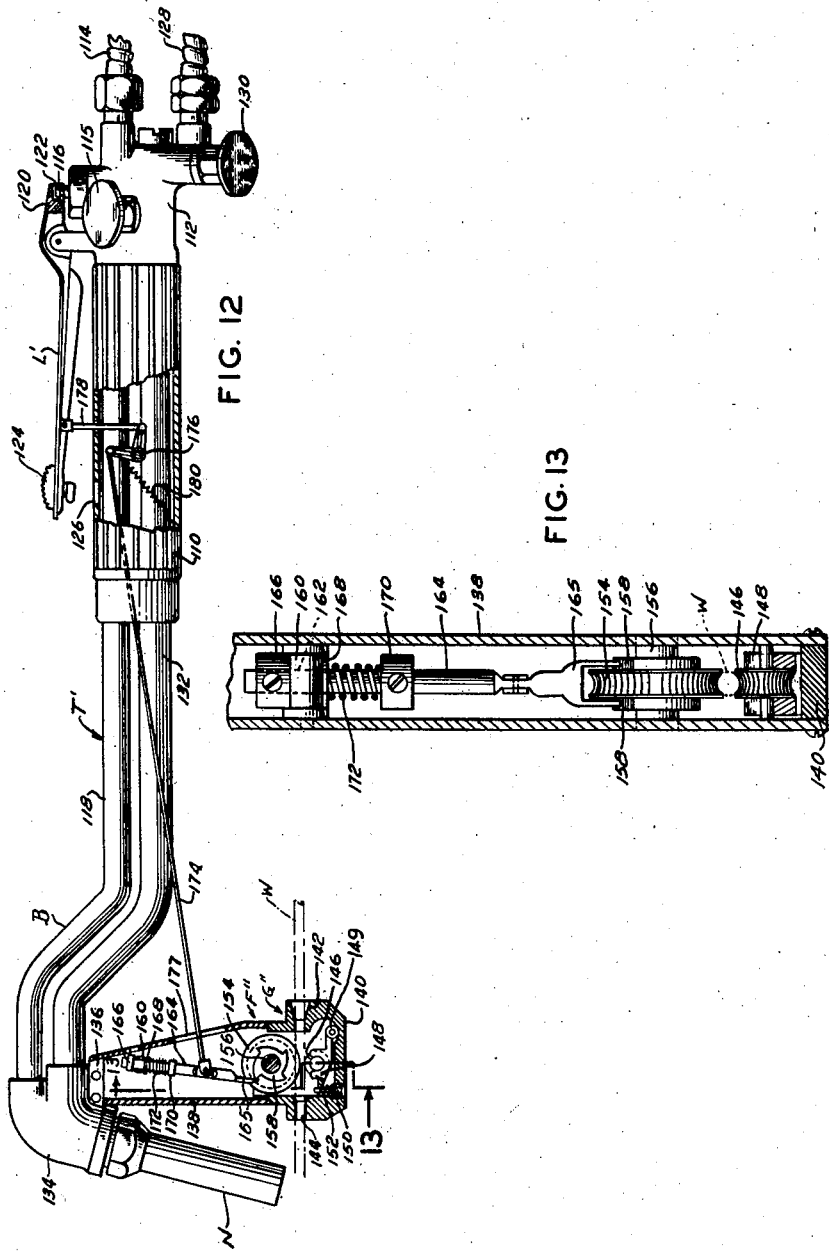
INVENTORS
WILLIAM BRYCE NICHOLSON
EVERETT P. JONES
BY
ATTORNEY

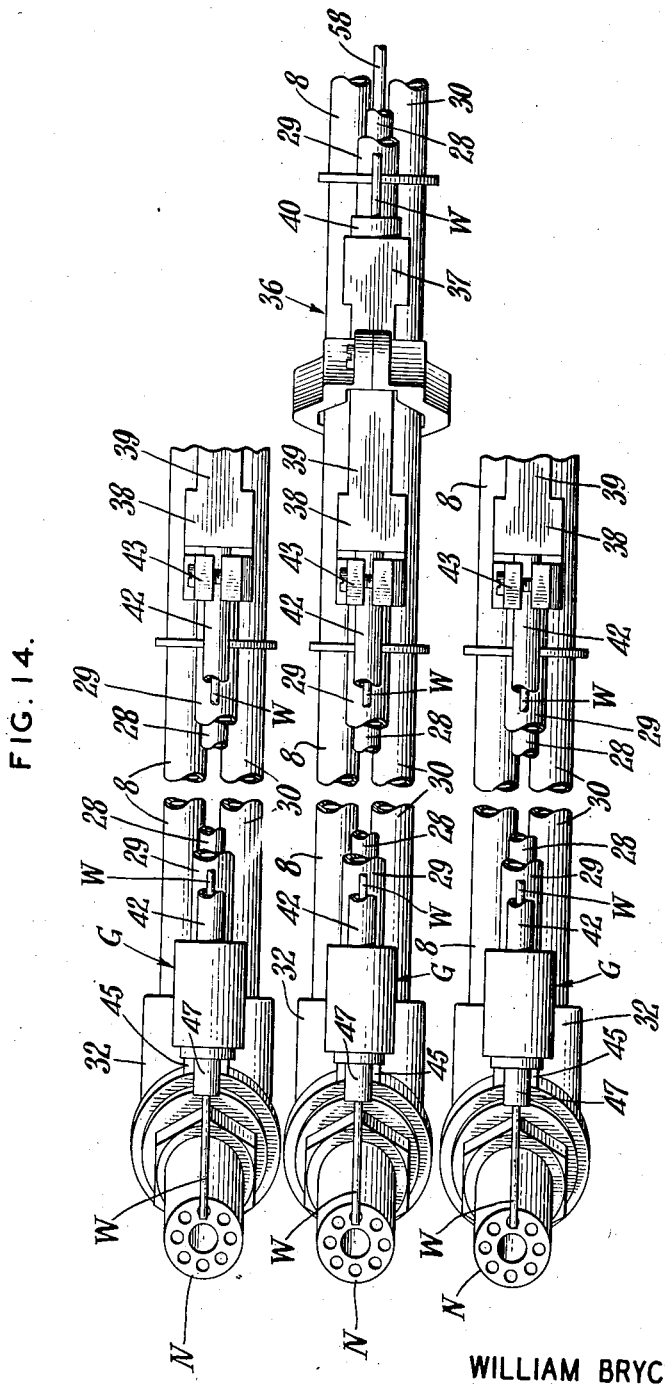

Patented Apr. 27, 1943

2,317,936

UNITED STATES PATENT OFFICE 2,317,936

APPARATUS FOR CUTTING OR FLAME-MACHINING METAL

William Bryce Nicholson and Everett P. Jones, Elizabeth, N. J., assignors to The Linde Air Products Company, a corporation of Ohio Original application June 11, 1937, Serial No. 147,696, now Patent No. 2,205,890, June 25, 1940. Divided and this application October 29, 1938, Serial No. 237,630

35 Claims. (Cl. 266—23)

This invention relates to the art of deseaming, cutting, or flame-machining metal work by directing a jet of oxidizing gas onto the same, and particularly to apparatus for starting such a cutting, deseaming, or flame-machining operation. This is a division of our application Serial No. 147,696, filed June 11, 1937, now Patent No. 2,205,890, granted June 25, 1940.

Heretofore, such operations have been started by preheating the metal work to an ignition temperature at the point where metal removal is to begin, and directing a jet of oxidizing gas onto the work at the point of preheating. After the cutting, deseaming, or flame-machining operation has begun, the preheat may be lessened owing to the preheat effect of the slag or oxidized metal that precedes, or is blown ahead of the nozzle as it is advanced over the work.

These present known methods require considerable time to initially preheat the metal work to an ignition temperature, and it has been customary to increase the delivery of preheating gas in order to reduce the preheat starting time, e. g., by providing the blowpipe with relatively large preheat orifices of much greater diameter than is necessary for continuing the operation after it has begun. Since the velocity of the present gas must be maintained above a certain limit in order to maintain flame stability and to prevent backfiring of the blowpipe, the large preheat orifices deliver a preheating gas of such volume that it impairs the efficiency of metal removal and greatly increases operating costs. Any attempt to decrease the volume of preheating gas after the metal removal operation has begun reduces the gas velocity and causes the preheat flame to become unstable and backfiring occurs.

When it is desired to remove surface metal within the boundaries of cold metal work, it becomes exceedingly difficult to sufficiently preheat the point where the metal removal operation is to begin. Problems of this latter nature arise in many instances, particularly in steel mills where it is desirable to employ a deseaming operation to remove cracks, fissures, and other imperfections within the surface boundaries of cold billets and the like.

An object of this invention is to provide apparatus which will deliver the most efficient and economical normal preheat capable of continuing a cutting, deseaming, or flame-machining operation after it has been started, and in which said apparatus includes means for augmenting the intensity of such normal preheat to effect the starting of such an operation within a relatively short time interval.

Another object of this invention is to provide apparatus for substantially instantaneously raising a portion of cold metal work to an ignition temperature including means for depositing a globule of molten metal onto said work and means for directing a jet of oxidizing gas onto said globule.

Other objects of the invention include, the provision of starting apparatus for reducing the starting time of a cutting, deseaming, or flame-machining operation including means for introducing a metal fuse or starting rod into a work preheating flame in such manner that it will almost instantly be raised substantially to the fusion temperature, and means for directing an oxidizing jet onto the globule of heated or molten metal thus formed causing the same to be forced into intimate association with the work being affected; the provision of apparatus for directing the metal fuse into the preheating and oxidizing jets in such angular relation with respect to the latter that upon melting it will be blown towards and deposited upon the surface to be affected; and the provision of a device for directing said metal fuse into the preheat flame so that it will receive the maximum heat therefrom.

Other objects and novel features of the invention will become apparent from the hereinafter described apparatus in the light of the accompanying drawings, in which:

Fig. 1 is an elevational view, partly in section, of a deseaming or cutting blowpipe or torch embodying the principles of the invention;

Fig. 2 is an enlarged sectional view along line 2—2 of Fig. 1;

Fig. 3 is an elevational section along line 3—3 of Fig. 2;

Fig. 4 is an elevational view, partly in section, of a modified form of apparatus embodying the principles of the invention;

Fig. 5 is a section along line 5—5 of Fig. 4;

Fig. 6 is a section alone line 6—6 of Fig. 4;

Figs. 7 to 11, inclusive, are diagrammatic sketches illustrating the correct positioning of the wire or starting rod in the preheat flames and the oxygen cutting jet;

Fig. 12 is an elevational view, partly in section, of a further modified form of apparatus embodying the principles of the invention;

Fig. 13 is an enlarged sectional view along line 13—13 of Fig. 12; and

Fig. 14 is a diagrammatic view of a machine embodying a bank of flame-machining nozzles provided with starting-rod feeding means.

This invention comprises the starting of a cutting, deseaming, or flame-machining operation by introducing an increment of fusible and oxidizable metal, preferably in the form of cylindrical, flat, or twisted wire or rod of ferrous metal, into a preheat flame, the intensity of which is sufficient to continue the operation in the most efficient and economical manner after the same has been started. The portion of oxidizable metal so introduced into the preheat flame instantly melts or becomes semi-molten and falls or is deposited onto the metal work at the starting zone or place where metal removal is to begin. When the increment of wire or starting rod introduced into the preheat flames reaches a semi-fluid state e. g., at a temperature above the ignition point, a jet of cutting or oxidizing gas is directed onto the same thereby superheating and oxidizing the globule of molten metal formed by the wire fuse, and forcing it onto the metal work to be affected. The heat generated by the oxidation of the increment of hot or molten metal is readily transferred to a small area of the work beneath the same and is sufficient to raise that area of metal to the kindling temperature. Continued application of oxygen at the point where the globule is deposited, effects oxidation of the work, which may be converted into a cutting, deseaming, or flame-machining operation by moving the oxygen jet relative to the work. Continued operation is maintained by virtue of the inherent heat of the puddle formed by the fused metal work and the action of the relatively low intensity preheat flames.

Care must be exercised in practicing the method of this invention to avoid incorrect deposition of the globule of molten metal on the work; otherwise the jet of oxidizing gas may dislodge the globule and blow it away from the place where metal removal is to begin. It has been found that the wire or starting rod preferably should be introduced into the preheat flames and the oxygen jet at such an angle that it will intersect the axial center line of the cutting oxygen stream before its end contacts the metal work.

Referring to Figs. 7 to 11, inclusive, the angularly-arranged blowpipe nozzle N in each figure is disclosed in combination with the metallic fuse wire or starting rod W. Depending on the specific construction of the nozzle N, the wire can be introduced at various angles as illustrated in Figs. 7 to 11; however, in each instance it is to be noted that before the end of the metal rod contacts the work it intersects the axial center line X of the cutting oxygen jet discharging from the central oxygen passage P of the nozzle, and the rod also intersects more than one of the preheating flames Y.

One form of apparatus capable of effecting the hereindescribed process is disclosed in Figs. 1, 2 and 3 of the drawings. It comprises an oxyacetylene torch T, upon which is mounted a starting rod feed device F near the forward portion thereof adapted to feed incremental lengths of cylindrical, flat, twisted, or otherwise formed metal wire W into the preheating jets delivered by the nozzle N of torch T. The feeding device F is connected to, or otherwise associated with, a manually-operable lever L which is a common operating handle for the valve 9 and the starting rod feed device F, and is adapted to open the cutting oxygen valve on the torch T and to feed an increment of wire or rod into the preheat flames of said torch. In order to direct the successive increments of starting wire into the preheat flames at the proper angle and position, a guiding device G is mounted on the torch adjacent the nozzle N. This device is adapted to guide the successive increments of starting wire into the preheat flames in such a manner that they will be substantially instantly heated to a molten state. The guide G also positions the starting wire increments in the stream of oxidizing gas so that the molten metal from the wire is oxidized adjacent a predetermined place where a metal removing operation is to begin.

Referring to Fig. 1 of the drawings, torch T comprises a handle 5 having a valve body 6 at its rear end adapted to support oxygen and acetylene connections and to form passages and chambers for controlling the flow of the respective gases within the torch. An oxygen inlet 7, adapted to be controlled by a valve (not shown), is attached to the body 6 and directs the incoming oxygen into chamber 3 within the body 6, which chamber is connected to the oxygen duct 8. For controlling the flow of cutting oxygen to the tip or nozzle N, a valve is provided within the body 6, comprising a valve head 9 and stem 10 resiliently held in closed position by a spring 11. The valve 9 is operated by a control handle or lever L pivoted to the outside of handle 5 near its front end. A valve-operating bell crank 13 is pivotally mounted on a pin 14 within the cylindrical handle 5. One arm of the bell crank 13 is connected to the lever L by a link 12. For a purpose to be hereinafter described, it is desirable that the control handle or lever L be movable a certain distance independently of the bell crank 13, and for this reason a lost-motion connection is provided between the bell crank 13 and the lever L which connection causes the operation of the starting rod feed device F and the cutting oxygen valve 9 to be successive. As disclosed, an elongated slot 15 in the lower portion of the link 12 is adapted to cooperate with a rigidly-mounted pin 16 located at the end of one leg of the bell crank 13.

The bell crank 13 is provided with an abutment aligned with one end of a plunger 21, the opposite end of which is adapted to engage the valve stem 10. Thus it is seen that the valve 9 may be unseated by depressing the control handle or lever L, and upon release of said lever, spring 11 will automatically re-seat valve 9. An acetylene inlet 22, controlled by a main acetylene valve 23 is likewise attached to the body 6 and controls the flow of acetylene to a mixing throat where it is mixed with oxygen from the oxygen inlet 7, which oxygen may be bled through by-pass 26.

The feeding device F is intended to feed incremental lengths of metallic starting rod or wire into the preheat flames issuing from the torch nozzle N in timed relation with the opening of the cutting oxygen valve 9. One form of apparatus capable of feeding the starting rod or wire as required is disclosed in Figs. 1 to 3, inclusive, and is conveniently mounted on the torch T between the handle 5 and the nozzle N in position to maintain balance of the torch. The starting wire feeding device F includes a wire-supporting and guiding device or container 36 comprising two spaced leg portions 37 and 38 integrally joined at their lower ends by a strip 39. The upper end portions of the legs 37 and 38 are provided with concave surfaces, the curvature of which corresponds to the curvature of the lower pipe 29 extending between the handle 5 and the nozzle head 32. The guiding device 36 is soldered or welded to the pipe 29 and provides a convenient support and guiding means for the metallic wire. It positions the wire with respect to the feeding device F so that gripping mechanism may effectively engage and deliver incremental lengths of the wire in front of the torch nozzle N. For the purpose of preventing excessive wear between the metallic wire and the support 36, hardened steel bushings 40 and 41 are inserted within axially aligned wire-guiding bores within the legs 37 and 38.

In accordance with the principles of this invention it is desirable to introduce the incremental lengths of metallic starting rod or wire into the preheat flames and the oxidizing gas jet so as to maintain a specific relation between the wire or rod and the flames and cutting jet. In the embodiment disclosed in Figs. 1 to 3, inclusive, this has been accomplished by providing a metallic conduit 42 between the support 36 and the tip of nozzle N. The tube 42, which serves also as a brake to prevent the rod gripper or clutch from moving the rod back during rearward movement of the clutch, is fixed within leg 38 of the support 36 by the clamp 43. The exit of the tube 42 is accurately located with respect to the outlets of the nozzle N by a bracket 45 fixed to and depending from the torch head 32. A hardened steel guiding bushing or rod guide 47 is mounted in the bracket 45 in such angular relation with respect to the tip or nozzle N that it directs the incremental lengths of metallic starting rod or wire into the preheat flames at a point adjacent the ends of the inner cones of such flames. The bushing 47 also directs the starting rod or wire into the oxidizing jet so that it will intersect the axial centerline of said jet before the end of the wire contacts the metal work.

Feeding of incremental lengths of metallic wire past the support 36, through the tube 42, and into the preheat flames and oxidizing jet may be accomplished by an oscillatable gripping device or member. Such a device may be positioned with regard to the support so that during the clockwise or advancing portion of its oscillating or reciprocating movement it will grip the wire or rod and force it along the tube 42, and will freely ride over the wire or rod during the counter-clockwise or return portion of its oscillating or reciprocating movement.

In the embodiment of the invention shown in Figs. 1 to 3 inclusive, the pivotally mounted gripping device may comprise a two part yoke or housing 52 comprising matched legs adapted to straddle the conduits 8, 28, 29 and 30 of torch T. The lower portion of the yoke 52 extends below and around the wire support and guiding device 36. Thus the starting wire or rod passes through the yoke or housing 52. A pivotal mounting 48 for the yoke 52 is soldered or welded to the top of the conduits 8 and 30 and it is likewise straddled by the yoke 52, supporting the same for pivotal movement on a pin 51. For effecting the incremental feeding of the metallic wire or rod during the oscillation of the yoke 52, and gripping plate member or clutch (through which the rod or wire also passes) is positioned within the yoke and is provided with a central aperture of slightly greater diameter than that of the wire. The reciprocating or block plate 54 is of hardened steel construction, and the aperture therein is countersunk in only one surface so that a slight tilting movement of the plate at the beginning of the clockwise or advancing oscillation or movement of the yoke 52 will cause the pawl-like forward edge of the aperture to seize the wire and advance a predetermined or measured portion of it toward the nozzle N. The edge within the hole of the reciprocating disc or block 54, constitutes an element carried by the block in position to come against the starting wire or rod, and lock it against movement relative to the block when the block moves toward the tip. During the counter-clockwise or return portion of the oscillation or movement, the countersunk aperture will permit the gripping plate 54 to freely ride over the wire.

Inasmuch as it is desirable for the gripping plate or member 54 to tilt slightly during its actuation, it may be loosely pivotally mounted on pins or projections 56 within recesses 55 in opposed faces of the legs of the yoke member or reciprocating housing 52. Since the recesses 55 are provided with shoulders 50 adapted to contact the edges of the gripping plate 54 during the counter-clockwise portion of the oscillating movement of the yoke 52, they permit the plate to tilt in only one direction from the longitudinal axis of the yoke 52. These shoulders 50, therefore, aid in returning the plate to its initial position by maintaining in its position to freely slide over the wire. At the beginning of the clockwise or advancing portion of the oscillating or two and fro movement of yoke 52, gripping of the wire by clutch or disc 54 results when the plate is tilted slightly. This tilting movement of plate 54 may be effected if its lower edge is frictionally engaged by a stationary member. A leaf spring 61 is riveted to the top surface of the element 39, and so positioned that a slightly bowed portion thereof frictionally engages the lower edge of the disc 54 at the beginning of the clockwise portion of the oscillating movement of the yoke 52.

For the purpose of preventing excessive counter-clockwise pivotal movement of the gripping plate 54 about its pivot 56, when the device is not threaded with wire, a plate 49 is attached to the rear edges of the legs of yoke 52 in such manner that it overlies the recesses 55 formed in these legs. The plate 49, of course, is provided with an opening sufficient to prevent interference with the passage of the wire through the gripping plate 54.

The yoke 52 may be oscillated or moved to and fro by any manually operable actuating means, and in the preferred embodiment of the invention as disclosed in Figs. 1 to 3, inclusive, it is advantageous to effect this oscillation or movement in timed relation with the operation of the cutting oxygen valve 9. For this reason, operating lever L has been constructed so that its movement will be magnified, and it has been arranged so that its movement will impart oscillations of sufficient magnitude to the yoke 52. The slot and pin connection 15, 16 between the lever 13 and the link 12 permits sufficient movement of the lever L to effect the desired oscillation of yoke 52 to feed an increment of wire to the preheat, without, however, opening valve 9.

The motion of lever L may be transmitted to the oscillatable or reciprocatable yoke 52 by means of a set of movable elements including a rigid link such as an adjustable turnbuckle or motion transmitting connection 58, which has its one end pivotally connected to a second element or boss 57 welded to the forward portion of the lever L, and its other end pivotally attached to the top portion of the yoke 52. Thus it is seen that by partly depressing the lever L, feeding device F will function to feed the desired increment of wire into the preheat flames, and upon completion of the depressing act, a slight continued operation of the feeding device and the operation of valve 9 will be effected. This slight additional feeding of wire into the preheat flames and oxygen jet does not affect the process; the wire is melted and blown away as waste material. A compression spring 60 is attached to the top portion of yoke 52 and also to a portion of the torch T ahead of the feeding device F for returning the feeding device, the oscillatable yoke 52, and the lever L to their initial positions upon release of the latter.

Wire of short lengths, or wire from a reel which may be conveniently strapped to the operator's back can be fed along the torch T through the bushing 40, the aperture in gripping plate 54, the bushing 41, the tube 42, and the guiding bushing 47, to a correct position in front of the outlets of nozzle N. The remainder of a length of wire which is too short to be fed by being directly engaged by the clutch, may be advanced through the guide bushing 47 by the push of a new length of rod behind it.

A modified form of the apparatus embodying the principles of this invention is disclosed in Figs. 4 to 6, inclusive. It includes a modified wire-feeding device in combination with the form of torch as disclosed in Figs. 1 to 3, inclusive.

Referring specifically to Figs. 4 and 5, the torch T is provided near its forward end with a combined feeding and guiding device F' and G'. The combined feeding and guiding device extends downwardly along the torch nozzle N and in such relation with said nozzle that wire may be guided and incrementally fed into the preheat flames and the oxygen jet in the manner disclosed in connection with the previously described apparatus of Figs. 1 to 3, inclusive.

A modified form of rod-feeding apparatus is illustrated in Figs. 4, 5 and 6. As shown, a tiller wire or motion-transmitting connection 100 extends from the feeding device F'' to a trigger or actuating element R fastened to the handle 5 of torch T. The trigger on handle 5 is adjacent to but independent of the lever L so that they may be conveniently manipulated simultaneously or otherwise by the operator.

The combined feeding and guiding device F'' and G' is mounted within a case or container 72, which is supported by a split clamp 70 tightly fitting around the conduits 8, 28, 29 and 30 of torch T. The case 72 comprises two sheet metal portions 73 and 74 which are integrally joined at their lower ends by overlapping portions and a screw 75, which latter, as indicated, also secures to the case 72 an end of an upwardly turned member 75'. Member 75' has a free end in frictional engagement with the starting rod at a point between the gripping mechanism and the nozzle. The upper extremities of the portions 73 and 74 are securely fastened to the clamp 70 by a connection including elongated slots which permit slight angular adjustment of the case 72, and accordingly positions the starting rod in proper relation to the torch, for cooperation with nozzles of different length. Obviously the actuating element is adapted for manipulation so that the starting rod may be fed prior to, simultaneously with, or subsequent to manipulation of lever L.

One leg 73 of the case 72 is provided with lips 76 which form with the leg 74 a chamber within which the gripping mechanism may be located, and to which the guiding mechanism may be attached. A guiding boss 77 of hardened steel for guiding the metallic wire through the exit end of case 72 is welded or soldered to one lip formed from leg 73, and is provided with a bore 78 of slightly larger diameter than that of the metallic wire which is adapted to be fed therethrough. The boss 77 is also provided with a bore 79 and a counterbore 80 for receiving part of the gripping mechanism to be hereinafter described. Another guiding boss 81 is attached to the other lip formed from leg 73 which forms the entrance to case 72, and it is likewise formed of hardened wear-resisting steel.

The gripping and propelling means of both the first and second forms of the invention are generically the same, in that each depends upon the oscillating movement of an element for propelling the wire, and upon a pivotally mounted gripping plate adapted to seize the wire during the clockwise portion of its oscillation, and to release and freely slide over the wire during the counter-clockwise portion of its oscillation. The oscillatable element of the modified apparatus shown in Figs. 4 to 6, inclusive, takes the form of a lever 91 mounted at the central portion of case 72 by a pivot shaft 92. The lower end of lever 91 is pivoted to a hardened steel gripping plate 93, and the upper end of lever 91 is attached to the connection 100 which is adapted to transmit movement to said lever. For the purpose of compensating for the angularity of lever 91 during oscillation, pivotal shaft 92 is provided with a central opening adapted to slidingly engage and support lever 91 thereby permitting relative movement between the lever and its pivotal support.

The wire-gripping plate 93 is similar to the corresponding gripper 54 of the modification disclosed in Figs. 1 to 3, inclusive, in that it is provided with an aperture 94 countersunk only in one face of the plate for permitting free movement of the plate over the wire in one direction of its movement and effecting gripping of the wire during its movement in the opposite direction. The plate 93, however, differs from gripper 54 in that a second aperture 95 is provided which is countersunk at each face of the plate. The latter aperture forms a cross-head connection with a guiding bolt 96 rigidly mounted within case 72 by the screw threads of bore 79 within boss 77 to provide a rigid bearing surface extending parallel to the direction in which the wire W is fed. Clockwise motion is imparted to the lever 91 by manually operable means, and counter-clockwise motion is imparted to said lever by a coiled compression spring 97, which in the present embodiment is shown encircling bolt 96, and one end of which is received within counterbore 80 of boss 77, the other end of which abuts against gripping plate 93.

Oscillation of lever 91 may be effected by manually operable means independent of the operation of the main oxygen valve 9. In the modified form of the invention, a trigger or actuating element R is mounted on the handle 5 of torch T in position relative to the lever L so that it may be operated at will. The tiller wire 100 connects the actuating element R with one end of the oscillatable lever 91.

Referring to Fig. 6, a split-clamp 101 is mounted in fixed relation about handle 5 by fastening means 102. The clamp 101 is provided with a protruding boss 103 upon which is mounted a stud 104. The stud supports the trigger R and is provided with a cotter pin for maintaining the trigger thereon. The trigger comprises a circular disc having a tangentially arranged finger operating lever 108. The periphery of the disc is provided with a groove 105 in which the wire connection 100 is adapted to be wrapped. A pin 106, adjacent one end of the groove 105, anchors the connection 100 to the trigger element.

A further modified form of the apparatus embodying the principles of this invention is disclosed in Figs. 12 and 13. It includes still another form of wire-feeding device in combination with a somewhat different form of cutting torch from that disclosed in Figs. 1 and 4.

Referring specifically to Figs. 12 and 13, torch T' comprises a handle 110 having a body 112 at its rear end adapted to support oxygen and acetylene connections and to form passages and chambers for controlling the flow of the respective gases within the torch. An oxygen inlet 114 adapted to be controlled by a valve 115 is attached to the body 112 and directs the incoming oxygen into chambers within the body 112 and through the oxygen duct 118. For controlling the flow of oxygen through the torch T', an additional spring-closed valve (not shown) is provided in the body portion 112, including a valve-stem 116 extending outside of said body. Valve-stem 116 is adapted to be operated by a hand lever L' pivoted intermediate its ends to the body portion 112. The end of lever L' adjacent to the valve-stem 116 is provided with a head 120 having an under-cut recess 122 adapted to provide a lost motion connection between the end of stem 116 and the head 120, for a purpose to be hereinafter described. The opposite end of lever L' is provided with a slidable hook 124 adapted to pass within an opening 126 formed in the handle 110 and to engage the inner wall thereof. An acetylene inlet 128 adapted to be controlled by a valve 130 is also connected to the body portion 112, and it conducts acetylene to passages and chambers within the torch T' where it is mixed with oxygen to form a combustible mixture which passes through the conduit 132. The conduits 118 and 132 are adapted to be connected with a head 134, and in the present instance it is desirable to offset the handle 110 relative to the head 134 for a purpose to be hereinafter described. The conduits 132 and 118 are therefore bent upwardly at a 45° or other suitable angle from the horizontal, and after the desired offset has been accomplished they are again bent to a horizontal position and connected with the head 134, the tubes and nozzle thereby cooperating to form a gooseneck. The nozzle N is adapted to be connected with the head 134, and to direct preheating jets and an oxidizing stream from its end.

Referring to Fig. 12, the torch T' is provided with a combined feeding and guiding device F'' and G'' at its forward end. The combined feeding and guiding device extends downwardly along the torch nozzle N in a somewhat similar manner to that disclosed in Fig. 4, and in such relation with said nozzle that wire may be guided and incrementally fed into the preheat flames and the oxygen jet in the manner disclosed in connection with the previously described apparatus, except that by offsetting the head relatively to the handle through the use of a bent portion B of the conduits, the rod may be located in close proximity to the handle 110.

The feeding and guiding device F'' and G'' comprises a two piece case 138 rigidly secured to and depending from a lug 136 integrally associated with the head 134, preferably at a place within the space defined and bounded by the bent portion B of conduits 132 and 118, and the nozzle N. The case 138 is adapted to enclose and support the wire feeding and guiding mechanism. A feeding body 140 is adapted to be secured to the lower extremity of the case 138, and it is provided with guides 142 and 144 at the entering and exit ends of said body. Each of the guides 142 and 144 are provided with countersunk portions adapted to facilitate the passage of the wire through said body 140.

The incremental feeding of the wire into the preheat and oxygen streams of the torch T' is effected by an incremental rotary movement of a pair of friction wheels between which the wire W is fed. Either of the friction wheels may be adjustably supported relative to the other, and in the embodiment disclosed, the lower friction wheel 146 is journalled in an adjusting link 148 pivoted on a pin 149 within the body portion 140. The end of link 148 opposite to that which is pivoted, is provided with an aperture adapted to cooperate with an adjusting pin 150 adjustably secured in the bottom portion of the body 140. A compression spring 152 encircles the adjusting pin 150 and resiliently urges the adjusting link 148 clockwise about its pivot. A cooperating friction wheel 154 is mounted on a shaft 156 extending between the sides of the case 138. Both the wheels 146 and 154 are vertically aligned, and their peripheral surfaces are grooved and knurled so that they will effectively grip the wire W and feed it toward the nozzle N when the wheels are rotated.

Incremental rotary movement of the gripping wheels 154 and 146 is effected by the motion of hand lever L'. In the embodiment of the invention disclosed in Figs. 12 and 13, this has been accomplished by providing a ratchet wheel and pawl mechanism adapted to be actuated through motion-transmitting connections by the lever L'. The ratchet wheel and pawl mechanism may take the form of a single or double ratchet wheel and pawl; in the embodiment of Fig. 12, the friction wheel 154 is provided with a ratchet wheel 158 on each side thereof. An oscillatable lever may be provided for supporting and actuating the pawling means and, as shown, a pivot shaft 160 extending between the sides of case 138 and having a central aperture 162, is adapted to support a ratchet-pawl 164. The aperture 162 and the pawl 164 form a cross-head bearing and compensate for the angularity due to the pivoting of pawl 164 about pivot 160. The lower extremity of the pawl 164 is provided, in the present embodiment, with a bifurcated portion 165 adapted to straddle the friction wheel 154 and to engage the teeth on ratchet wheels 158. A collar 166 is fixed to the upper extremity of the pawl 164 and is adapted to limit its downward sliding motion. A washer 168 is slidingly mounted on the pawl 164 below the pivot shaft 160, and it cooperates with a collar 170 and a spring 172 positioned between the two for resiliently urging the pawl 164 into engagement with the ratchet teeth of ratchet wheels 158, while still permitting sliding of said pawl relative to its pivot 160 during its oscillatory movement.

A drawer bar or motion-transmitting connection 174 is connected to an intermediate point of the pawl 164, and extends through an elongated slot 177 in the one side of the case 138. The drawer bar 174 extends, for at least a portion of its length, alongside of the conduits 132 and 118, passing within the handle 110, and is attached to one arm of a pivotally mounted bell-crank lever 176. The other arm of the bell-crank lever is connected with a link 178 extending through the side wall of the handle 110 and in spaced relation to the vertically aligned conduits 132 and 118. The link 178 is adapted to be connected to one side of the hand lever L'. In order to insure the return of pawl 164 to its initial position, and also to take up the lost motion within the connections between elements 120 and 116, a spring 180 is connected between the bell-crank lever 176 and the handle 110.

The lost motion connection between the stem 116 and the head 120 permits feeding the desired length of the wire into the preheat flames during the initial movement of hand lever L' without the oxygen stream being turned on, and continued operation of lever L' turns on the oxygen jet. Inasmuch as this latter movement of lever L' takes place after pawl 164 has disengaged the ratchet wheels 158, no additional feeding of wire into the preheat flames will occur,—a characteristic not possessed by the device shown in Fig. 1.

While the principles of the invention have been illustrated in connection with a deseaming torch, it is to be understood that they may be applied with equal facility to a cutting torch or to a machine embodying a bank of flame-machining nozzles. For example, Fig. 14 illustrates a row or bank of flame-machining nozzles N, arranged to deliver the heating flames and oxidizing gas streams thereof obliquely against successive zones on a surface of a metal workpiece W, to remove surface metal therefrom in a known manner. Each nozzle is carried by a blowpipe equipped with a separate starting-rod feeding means of the type illustrated in Figs. 1, 2, and 3. As previously explained herein, each of such feeding means holds a steel rod, and when actuated, positions a section of such rod in front of the combustible gas and oxidizing gas outlets of the nozzle to be first heated and then oxidized, with the evolution of exothermic heat at an area on the work surface where metal removal is to be started. The several areas thus heated by the combustible gas flames and the supplemental exothermic heat, are located along a starting zone on the work surface having a width corresponding to the number of blowpipes or nozzles in the bank or row of blowpipes. The elements of the several blowpipes and the rod feeding devices thereof, are designated by the reference numerals used in Figs. 1–3. Additionally, certain features of certain embodiments may be employed with features of other embodiments without departing from the scope of the invention.

We claim:

1. Apparatus for performing a metal-removing operation such as cutting, desurfacing or deseaming a ferrous metal body, said apparatus comprising, in combination, a blowpipe including nozzle means having outlets for delivering a heating medium adapted to heat a surface portion of the metal body to provide a starting zone thereon, and also for delivering an oxidizing gas stream against said zone; starting mechanism associated with said blowpipe including feeding means adapted when actuated to advance a small measured portion of fusible and oxidizable metal toward the nozzle means, and supporting means for supporting a supply of said metal and for holding such advanced portion in front of the outlets of said nozzle means until said portion is heated to its ignition temperature by said heating medium and burned in the oxidizing gas stream at the start of the metal-removing operation to produce exothermic heat to supplement the heat of the heating medium and thereby more quickly heat the starting zone to the combustion temperature.

2. Apparatus for performing a metal-removing operation such as cutting, desurfacing or deseaming a ferrous metal body, said apparatus comprising, in combination, a blowpipe including nozzle means having outlets for delivering heating flames and an oxidizing gas stream; rod feeding mechanism for feeding starting rod in front of the outlets of the nozzle means where a portion of the rod is heated by the heating flames and oxidized by the oxidizing gas stream, said mechanism including a rod-gripping element constructed and arranged to grip the rod and, upon actuation, to advance the rod toward said nozzle means; and actuating means for causing the gripping element to move and advance the rod.

3. The combination with an oxygen cutting torch having a valve that controls the supply of cutting oxygen to the tip of said torch and a control handle for operating the valve, of mechanism for feeding a starting rod in front of the cutting oxygen outlet of said tip, and a device associated with said control handle for actuating said mechanism, said device and said handle being operable to first advance said rod and then open said valve that controls the cutting oxygen.

4. Apparatus for performing a metal-removing operation such as cutting, desurfacing or deseaming a ferrous metal body, said apparatus comprising, in combination a blowpipe including nozzle means having outlets for delivering heating flames and an oxidizing gas stream; rod feeding mechanism, including a rod-gripping member movable to and fro, for feeding starting rod in front of the outlets of the nozzle means where a portion of the rod is heated by said flames and oxidized by said oxidizing gas stream, said member being constructed and arranged to grip the rod when the member is moving in one direction only and, upon actuation, to advance the rod towards the nozzle means; actuating means spaced from said rod-gripping member; and motion-transmitting means connecting the actuating means and the rod-gripping member for transmitting motion of the actuating means to the rod-gripping member.

5. A starting rod feed attachment for a blowpipe comprising, in combination, rod supporting means provided with an opening for passage of starting rod therethrough; a tiltable rod-gripping member, movable to and fro, mounted in position for causing the starting rod to move through said opening and provided with an aperture through which the starting rod passes, said aperture being so constructed as to allow the member to ride over the rod during movement of the member in one direction, and said member being adapted to tilt and grip the rod at the beginning of movement of the member in the other direction.

6. The combination with a blowpipe, such as a deseaming, flame-machining or cutting blowpipe, of starting rod feeding apparatus comprising rod guiding means adapted to support a rod at spaced points; an oscillatable member pivotally mounted between said points; a tiltable gripping element in engagement with said rod; said oscillatable member being constructed and arranged to move said gripping element to and fro and means for tilting said element into rod-gripping position at the beginning of one portion of the oscillatable movement of said member.

7. A starting rod feeding attachment for a blowpipe, such as a deseaming, desurfacing or cutting blowpipe, comprising in combination, a rod support provided with an opening through which the starting rod passes; a lever; rod-gripping means connected to an arm of said lever and adapted to grip the rod and feed it forwardly through said opening during forward movement of said arm, and to release and freely slide over said rod during return movement of said arm; and resilient means for returning said gripping means and lever to their initial positions after they have completed their rod-feeding movement.

8. The combination with an oxygen cutting torch having a valve that controls the supply of cutting oxygen and a control handle for operating the valve, of apparatus for feeding a starting rod to the torch tip, and connections between said apparatus and the valve control handle, by which the valve control handle operates said apparatus to feed the starting rod.

9. In an oxygen cutting torch having a cutting jet orifice and one or more preheating jet orifices, and a valve for controlling the supply of cutting oxygen, apparatus for supplying a starting rod to the flames issuing from said preheating jet orifices, said apparatus including a reciprocating device that advances the starting rod, and a common control handle that successively operates the reciprocating device to advance the rod and opens the valve that controls the cutting oxygen.

10. The combination of a cutting torch having a cutting oxygen supply valve, a starting rod feed device, and a common operating handle for the valve and feed device.

11. In a cutting torch having a valve-operating lever and a starting rod feed device, the improvement of means by which said lever operates both the valve and feed device including a lost-motion connection that causes the operation of the feed device and valve to be successive.

12. In an oxygen cutting torch, an apparatus for feeding a starting rod to the tip of the torch including a reciprocating housing through which the starting rod passes, and clutch means in said housing adapted to cause the rod to move with the housing during the movement of the housing in one direction.

13. In an oxygen cutting torch, an apparatus for feeding a starting rod to the tip of the torch including a block with an opening through which the starting rod passes, means for causing the block to move toward and from the tip, and an element carried by the block in position to come against the rod and lock it against movement relative to the block when the block moves toward the tip.

14. The combination with an oxygen cutting torch having a tip with a cutting jet orifice, and one or more preheating jet orifices, of a starting rod feed device including reciprocating clutch means that grip the rod on the forward stroke, a brake to prevent the rod from moving back during the rearward movement of the clutch means, and a rod guide, ahead of the clutch means, through which the rod is advanced first by direct action of the clutch means and then by the push of a new length of rod behind it, said rod guide extending close to the tip, the end of the rod guide being just behind the position occupied by the front end of the rod after the rod has been melted away by a cutting operation.

15. In combination with a blowpipe, such as a flame-machining, deseaming or cutting blowpipe, an apparatus for feeding a starting rod to the tip of the torch including a member movable to and fro, and clutch means on said member adapted to grip the rod and cause the rod to move with the member during the movement of the member in one direction.

16. Apparatus for performing a metal-removing operation such as cutting, desurfacing or deseaming a ferrous metal body, said apparatus comprising, in combination, a blowpipe including nozzle means having outlets for delivering heating flames and an oxidizing gas stream; rod feeding mechanism for feeding starting rod in front of the outlets of the nozzle means where a portion of the rod is heated by the heating flames and oxidized by the oxidizing gas stream, said mechanism comprising a ratchet wheel provided with a surface adapted to grip and advance the rod with rotation of the wheel; means for yieldingly holding said wheel and said rod in engagement for gripping of the rod by said wheel, and a pawl for turning said wheel through a small arc in the direction for advancing the rod toward the nozzle.

17. Apparatus for performing a metal-removing operation such as cutting, desurfacing or deseaming a ferrous metal body, said apparatus comprising, in combination, a blowpipe including nozzle means having outlets for delivering heating flames and an oxidizing gas stream, and valve means for controlling the supply of oxidizing gas; rod feeding mechanism for feeding starting rod in front of the outlets of the nozzle means including a gripping element adapted for limited movement in one direction on a single actuation, and constructed and arranged to grip the rod and to advance the rod toward said nozzle means, and a common control means for operating said valve and said gripping element, including a lost motion device of such a nature that the control means can continue to move for operation of said valve after said element reaches the limit of its movement.

18. Apparatus for performing a metal-removing operation such as cutting, desurfacing or deseaming a ferrous metal body, said apparatus comprising in combination a blowpipe including handle means by which said blowpipe may be held, a blowpipe head, nozzle means having outlets for delivering heating flames and an oxidizing gas stream, and one or more conduits connecting said handle means and said head, each of said conduits having a straight portion thereof adjacent to said handle means and a bent portion adjacent to said head to offset said head and nozzle means relatively to the longitudinal axis of said handle means; rod feeding mechanism attached to said blowpipe for feeding starting rod directly in front of the outlets of the nozzle means where a portion of the rod is heated by the heating flames and oxidized by the oxidizing gas stream, said mechanism being constructed and arranged so that at least a part of said mechanism is positioned within the space defined and bounded in part by the bent portions of said conduits, and so that a length of substantially straight rod supplied to said mechanism will lie relatively closely adjacent and substantially parallel to the straight portions of said conduits.

19. Apparatus for performing a metal-removing operation such as cutting, desurfacing or deseaming a ferrous metal body, said apparatus comprising, in combination, a blowpipe including nozzle means having outlets for delivering heating flames and an oxidizing gas stream, and handle means by which said blowpipe may be held, said handle being provided with a space therein; starting mechanism associated with said blowpipe for feeding fusible and oxidizable starting metal, said mechanism including supporting and guiding means for supporting a supply of said starting metal and for advancing and holding a small portion of said starting metal in front of the outlets of the nozzle means at the start of said operation where such small portion of metal is heated by said heating flames and burned in the oxidizing gas stream to supplement said heating flames in heating a portion of said body; manually-operable actuating means for said starting mechanism mounted adjacent to said handle; motion-transmitting means connected to said mechanism; and linking means located in said space within said handle for connecting said actuating means and said motion-transmitting means, thereby operatively connecting said actuating means and said starting mechanism.

20. Apparatus comprising, in combination, a blowpipe such as a cutting, deseaming or flame-machining blowpipe; and a starting rod feeding mechanism including, a case through which said rod is fed; a pair of cooperating rollers mounted within said case and having surfaces adapted for gripping said rod between the rollers and advancing it on rotation of said rollers; one of said rollers being supported in operative position relative to said other roller by a member pivoted near one end to said case; and a pawl means adapted to cooperate with a ratchet wheel provided on one of said rollers for rotating it.

21. Apparatus for performing a metal-removing operation such as cutting, desurfacing or deseaming a ferrous metal body, said apparatus comprising in combination, a blowpipe including nozzle means for delivering a heating medium adapted to heat a surface portion of said metal body to the ignition temperature to provide a starting zone thereon, and also for delivering an oxidizing metal-removing gas stream against said zone; and means for supplementing the heat of said heating medium for more quickly forming said starting zone, said last-mentioned means comprising a starting rod guide for guiding a starting rod of oxidizable and fusible material and for directing said starting rod in front of said nozzle means, and means for introducing a predetermined increment of said starting rod, into said heating medium and said stream, to be heated by said medium and oxidized by said oxidizing gas stream to produce exothermic heat for supplementing said heating medium in heating said surface portion to the ignition temperature.

22. A metal-removing torch having a metal-removing oxygen jet orifice and one or more preheating jet orifices; and including a valve for controlling the supply of metal-removing oxygen; a control handle movable through a stroke; a valve-operating member in position to be displaced in a direction to open said valve during the latter part, and only the latter part, of the stroke of said handle in one direction; and apparatus for supplying a starting rod to the flames issuing from said preheating jet orifices, said apparatus comprising a series of connected movable elements that are actuated from said control handle and that transmit motion from said control handle to said starting rod, said movable elements including a reciprocating element, and a rod feeder operable by said element to advance said rod a predetermined distance during the initial part, and only the initial part of the stroke of said control handle.

23. In metal-removing apparatus comprising a torch that has preheating jet orifices, a metal-removing oxygen supply valve, and means for feeding a starting rod to the preheating jets before said oxygen supply valve is opened, the improvement which comprises a common lever for operating both the feeding means and said oxygen supply valve; motion transmitting means between the rod feeding means and said lever; and adjustable means adapted to control the amount of travel of the feeding means during operation of said lever.

24. Apparatus for feeding a starting rod to the nozzle of a metal-removing blowpipe including a stationary casing with means for rigidly connecting said casing to said blowpipe; rod gripping means supported by said casing adapted to grip the starting rod and to advance the rod in one direction; and a brake element supported by said casing for frictional contact with the starting rod.

25. Apparatus for feeding a starting rod to the tip of an oxygen cutting torch including a container having a rigid bearing surface that is parallel to the direction in which the starting rod is fed and means for connecting said container to the cutting torch, a housing in said container movable to and fro along said bearing surface of the container and held in line with the starting rod by said bearing surface and clutch means in said housing adapted to cause the rod to move with the housing during the movement of the housing in one direction along said surface.

26. Apparatus for feeding a starting rod to the tip of an oxygen cutting torch including a stationary container with means for rigidly connecting it to the cutting torch, clutch means located inside of said stationary container and movable back and forth on a bearing surface within said container and adapted to grip the rod during movement of said clutch means in one direction, a guide through which the starting rod passes, and a brake element in frictional contact with the starting rod.

27. A metal-removing torch starting rod attachment comprising mounting means adapted to be connected to a metal-removing torch; a starting rod feeding device supported by said mounting means and having starting rod guide means for guiding the rod from said feeding device toward the discharge end of the nozzle of said metal-removing torch; said mounting means being provided with an adjustable connection for varying the location of said rod relative to the discharge end of said nozzle.

28. The combination with a metal removing torch having a nozzle, of a starting rod feed device including gripping means adapted to advance the rod toward said nozzle; a rod guide adjacent to said nozzle; and means to inhibit the rod from moving backwardly from said nozzle; said guide providing a passage through which the rod is advanced first by direct action of said gripping means and then by pressure of a new length of rod advanced behind it.

29. The combination of an oxygen cutting, deseaming, or desurfacing torch having a nozzle for projecting preheating flames and an oxidizing stream; and starting rod feeding apparatus having means for introducing predetermined lengths of fusible and oxidizable metal starting rod in front of said nozzle.

30. Apparatus for preforming a metal-removing operation such as cutting, desurfacing, or deseaming a ferrous metal body, said apparatus comprising, in combination, blowpipe means including nozzle means having outlets for delivering heating flames and oxidizing metal removing gas; and starting rod feeding mechanism for feeding starting rod in front of the outlets of said nozzle means where a portion of said rod is heated by said heating flames and oxidized by said oxidizing metal-removing gas.

31. Apparatus for performing a metal-removing operation such as cutting, desurfacing, or deseaming a ferrous metal body, such apparatus comprising, in combination, a bank of blowpipe nozzles, each nozzle having outlets for delivering a heating medium and an outlet for delivering a stream of oxidizing gas; separate rod feeding mechanisms severally associated with said nozzles to feed a portion of an oxidizable metal starting rod in front of the outlets of each of said nozzles where such portion in each instance is heated by said heating medium and oxidized by said stream of oxidizing gas, each of said mechanisms including movable rod-gripping means constructed and arranged to grip a starting rod and, upon actuation, to advance such rod toward the nozzle associated therewith; and actuating means for operating said rod-gripping means.

32. Apparatus for thermo-chemically removing metal from a surface of a metal body, such apparatus comprising, in combination, flame-machining blowpipe nozzle means having combustible gas outlet means constructed and arranged to provide heating means to heat a relatively wide zone of said surface and also having oxidizing gas outlet means constructed and arranged to discharge such oxidizing gas against such heated zone; and mechanism operable to position sections of fusible and oxidizable ferrous metal rod material at points longitudinally of said zone and in front of both said combustible outlet means and said oxidizing gas outlet means, whereby such sections are heated by said heating means and oxidized by said oxidizing gas to produce additional heat along said zone supplementing the heat applied along said zone by said heating means, and means for operating said mechanism.

33. Apparatus for performing a thermo-chemical metal-removing operation such as cutting, desurfacing, or deseaming a metal body, said apparatus comprising, in combination, a blowpipe including nozzle means having an outlet for delivering a combustible gas to provide a heating flame adapted to heat a surface portion of said body at a starting zone thereon and also an additional separate outlet for delivering against said zone an oxidizing metal-removing gas stream in addition to said heating flame; and means for supplementing the heat applied to said zone by said flame, said last-mentioned means comprising a device adapted to hold oxidizable metal, feeding means adapted when actuated to introduce a predetermined but relatively small portion of such oxidizable metal from said device to a region in front of said nozzle means to be oxidized by said oxidizing gas stream, and means associated with said feeding means to actuate the latter prior to the delivery of said oxidizing metal-removing gas stream from said nozzle means.

34. Apparatus for performing a thermo-chemical metal-removing operation such as cutting, desurfacing, or deseaming a metal body, said apparatus comprising, in combination, a blowpipe including nozzle means having an outlet for delivering a combustible gas to provide a heating flame adapted to heat a surface portion of said body at a starting zone thereon, and also an additional separate outlet for delivering against said zone an oxidizing metal-removing gas stream in addition to said heating flame; and means for supplementing the heat applied to said zone by said flame, said last-mentioned means comprising a device adapted to hold oxidizable metal, and feeding means adapted when actuated to introduce a predetermined but relatively small portion of such oxidizable metal from said device to a region in front of said nozzle means, and means for actuating said feeding means.

35. Apparatus for starting a thermochemical metal-removing operation such as cutting, desurfacing, or deseaming a metal body, said apparatus comprising, in combination, a blowpipe including nozzle means having an outlet for delivering a combustible gas to provide a heating flame adapted to heat a zone of said body, said nozzle means also having an additional separate outlet for delivering against said zone an oxidizing metal-removing gas stream in addition to said combustible gas; a valve for controlling the flow of such metal-removing oxidizing gas; means for supplementing the heat applied to said zone by said flame, such heat-supplementing means comprising a device adapted to hold oxidizable metal, feeding means adapted when actuated to move a predetermined but relatively small portion of such oxidizable metal from said device to a position in front of such outlets, to be heated by said flame and oxidized adjacent said zone by said oxidizing gas stream; and common control means for actuating both said feeding means and said oxidizing gas control valve, to cause said predetermined portion of such metal to be moved to said position at the start of the thermochemical metal-removing operation, and to open said valve to deliver said oxidizing metal-removing gas stream.

WILLIAM BRYCE NICHOLSON.
EVERETT P. JONES.

CERTIFICATE OF CORRECTION.

Patent No. 2,317,936. April 27, 1943.

WILLIAM BRYCE NICHOLSON, ET AL.

It is hereby certified that error appears in the printed specification of the above numbered patent requiring correction as follows: Page 1, first column, line 28, for "present" read --preheat--; and second column, line 49, for "oxygen cutting" read --cutting oxygen--; page 3, first column, line 73-74, for "or block plate 54" read --plate or block 54--; and second column, line 30, for "in its" read --it in--; line 32, for "two" read --to--; line 34, for "disc" read --plate--; page 9, first column, line 10, claim 30, for "preforming" read --performing--; and that the said Letters Patent should be read with this correction therein that the same may conform to the record of the case in the Patent Office.

Signed and sealed this 15th day of June, A. D. 1943.

(Seal)

Henry Van Arsdale,
Acting Commissioner of Patents.